(12) United States Patent
Lule

(10) Patent No.: US 8,222,841 B2
(45) Date of Patent: Jul. 17, 2012

(54) VCM CONTROL CIRCUIT

(75) Inventor: Tarek Lule, Sainte Egreve (FR)

(73) Assignee: STMicroelectronics (Grenoble) SAS, Grenoble (FR)

( * ) Notice: Subject to any disclaimer, the term of this patent is extended or adjusted under 35 U.S.C. 154(b) by 357 days.

(21) Appl. No.: 12/254,641

(22) Filed: Oct. 20, 2008

(65) Prior Publication Data
US 2009/0102403 A1    Apr. 23, 2009

(30) Foreign Application Priority Data
Oct. 22, 2007  (FR) .................................. 07 58472

(51) Int. Cl.
*H02P 1/00* (2006.01)

(52) U.S. Cl. ........ 318/135; 318/119; 318/128; 318/560; 318/650

(58) Field of Classification Search .................. 318/135, 318/119, 127, 128, 265, 266, 282, 283, 560, 318/650, 652; 360/70, 72.1, 77.05, 77.06, 360/77.07, 250, 251, 264, 264.1, 264.2, 266.2, 360/266.3, 266.4; 369/47.1, 47.22, 60.01; 348/345, 437, 439, 222.1, 208.12, E5.045
See application file for complete search history.

(56) References Cited

U.S. PATENT DOCUMENTS

| | | | |
|---|---|---|---|
| 5,598,240 A * | 1/1997 | Haraguchi et al. | 396/84 |
| 5,675,562 A * | 10/1997 | Yanagi | 369/44.28 |
| 5,812,339 A * | 9/1998 | Kisaka | 360/78.09 |
| 5,936,792 A * | 8/1999 | Kobayashi et al. | 360/78.07 |
| 6,188,191 B1 * | 2/2001 | Frees et al. | 318/560 |
| 6,390,061 B1 | 5/2002 | Melville et al. | |
| 6,577,343 B2 * | 6/2003 | Ohkawara | 348/347 |
| 7,139,150 B2 * | 11/2006 | Spaur et al. | 360/77.08 |
| 7,504,795 B2 * | 3/2009 | Takaishi | 318/652 |
| 7,570,452 B2 * | 8/2009 | Takaishi | 360/78.06 |
| 7,693,411 B2 * | 4/2010 | Kwon et al. | 396/127 |
| 7,710,491 B2 * | 5/2010 | Ohta | 348/345 |
| 2003/0173834 A1 | 9/2003 | McGill | |
| 2007/0047942 A1 * | 3/2007 | Chang et al. | 396/133 |
| 2008/0240695 A1 * | 10/2008 | Usui | 396/55 |

FOREIGN PATENT DOCUMENTS

| | | |
|---|---|---|
| JP | 58 165679 | 9/1983 |
| JP | 10 014279 | 1/1998 |
| JP | 2003 186545 | 7/2003 |

OTHER PUBLICATIONS

French Search Report dated Jun. 6, 2008 from French Patent Application No. 07/58472.

* cited by examiner

*Primary Examiner* — Bentsu Ro
*Assistant Examiner* — Thai Dinh
(74) *Attorney, Agent, or Firm* — Wolf, Greenfield & Sacks, P.C.

(57) ABSTRACT

A method of controlling a moving part of a voice coil motor to move from an first position to a second position, wherein the position of the moving part is controlled by the level of an electrical signal applied to a coil of the voice coil motor, a first level of the electrical signal corresponding to the first position, and a second level of the electrical signal corresponding to the second position, the method including: at a first time, changing the electrical signal from the first level to an intermediate level, the intermediate level being chosen such that a peak overshoot of the moving part corresponds to the second position; and at a second time calculated to correspond to a delay of half an oscillation period of the moving part after the first time, changing the electrical signal to the second level.

28 Claims, 2 Drawing Sheets

VCM CONTROL CIRCUIT

CROSS REFERENCE TO RELATED APPLICATIONS

This application claims the priority benefit of French patent application number 07/58472, filed on Oct. 22, 2007, entitled "VCM Control Circuit," which is hereby incorporated by reference to the maximum extent allowable by law.

FIELD OF THE INVENTION

The present invention relates to a method and a control circuit for controlling a voice coil motor.

BACKGROUND OF THE INVENTION

FIG. 1 illustrates schematically in cross-section a mobile lens unit 100 comprising a cylindrical lens barrel 102 with a number of fixed lenses 104, 106 and 108 mounted therein, the lens barrel 102 having a conducting coil 110 mounted within its walls. The coil 110 is formed of a wire represented in cross-section by small circles with dots to represent a current flow one way in the wire, and crosses to represent a current flow in the opposite direction. Mobile lens unit 100 also comprises a housing 112, which is for example formed of plastic, and has rims 113, 114 at the top and bottom respectively, which extend some way towards the center of the housing, and act as stoppers for the lens barrel 102. A permanent magnet 115, which is for example also cylindrical, is mounted against the inner surface of the housing 112 and lies adjacent to the lens barrel 102. The coil 110, and the permanent magnet 115 together form a voice coil motor (VCM). Springs 116 and 118 are connected between the housing 112 and the lens barrel 102.

Coil 110 is connected to a current source, in this example by conductive springs 116 and 118. In particular, springs 116 and 118 connect opposite ends of coil to a control circuit 120, which comprises a variable current source coupled between spring 116 and ground, and a supply voltage Vdd connected to spring 118.

In operation, the mobile lens unit 100 is mounted over an image sensor (not shown), and the positioning of the lenses with respect to the image sensor can be adjusted by moving the lens barrel 102 up and down within the housing, which can be achieved by passing a current signal through the coil 110. Springs 116, 118 hold the lens barrel 102 at an first position at the bottom end of the housing resting against rim 113 when no current is applied to the coil. When current is applied to the coil, due to electromagnetic force generated by the current flow in a magnetic field, the lens barrel moves towards the top of the housing, counteracting the force of the springs 116, 118. Springs 116, 118 have an increasing restoring force the further the lens barrel is from its first position, meaning that the lens barrel rests at in equilibrium at a certain position depending on the current level applied to the coil.

FIG. 2A illustrates the current I applied to the coil for changing the position of the lens barrel 102 in the housing 112. As illustrated, the current is initially at an value $I_i$, which maintains the lens barrel at the first position. The first position could be with the lens barrel 102 at the bottom of the housing 112, or at any position within the lens housing. At a time $t_0$, a new current $I_f$ is applied, which has a value corresponding to the current that is needed to keep the lens barrel at the final position.

FIG. 2B illustrates the position x of the lens barrel in response to the change in the current at time $t_0$. As illustrated, from the initial position $x_i$, the lens barrel moves towards the final position $x_f$. However, the lens barrel 102 and springs 116, 118 form a mass spring system that oscillates before settling at the final position $x_f$. Damping in the system is very low, as the lens barrel is designed with very little friction, in order to reduce energy consumption. Thus the oscillations can continue for some time before the lens barrel settles at the final position. These oscillations cause problems, as the mobile lens unit cannot be used to capture images until the oscillations of the lens barrel have settled to within a certain amplitude, below which they do not affect the focusing of the lens. This settling time depends on the decay rate of the system, and can be several hundred milliseconds, meaning that there is a considerable delay before the lens can be used. In many optical applications, this delay is unacceptable.

This problem occurs when a lens barrel is moved upwards in the lens unit, by a step increase in the current, and also when the lens barrel is moved downwards in the lens unit, by a step decrease in the current. A further problem that can occur when the lens barrel 102 is to be moved to a final position close to the end stops provided by rims 113, 114 is that the oscillations cause an impact between the lens barrel and the end stops, which could damage the lens barrel and create unwanted noise.

One solution to these problems that has been proposed is to slowly change the current in the coil from the initial current to the final current. While this can help reduce the magnitude of oscillations, there is still a considerable delay before the lens unit can be used, particularly in smaller lens barrels designed for miniature application such as mobile telephones in which the friction of the lens barrel is extremely low.

SUMMARY OF THE INVENTION

It is an aim of embodiments of the present invention to at least partially address one or more problems in the prior art.

According to one aspect of the present invention, there is provided a method of controlling a moving part of a voice coil motor to move from a first position to a second position, wherein the position of the moving part is controlled by the level of an electrical signal applied to a coil of the voice coil motor, a first level of the electrical signal corresponding to the first position, and a second level of the electrical signal corresponding to the second position, the method comprising: at a first time, for example when the moving part is stationary with respect to the rest of the voice coil motor, changing the electrical signal from the first level to an intermediate level, the intermediate level being chosen such that a peak overshoot of the moving part corresponds to the second position; and at a second time calculated to correspond to a delay of half an oscillation period of the moving part after the first time, changing the electrical signal to the second level.

According to an embodiment of the present invention, the electrical signal is a current signal, and the first level, second level and intermediate level are current levels.

According to another embodiment of the present invention, the intermediate electrical signal is calculated based an electrical signal corresponding to an intermediate position of the moving part, according to the following formula:

$$x_s = (x_f - x_i)\Phi + x_i$$

$$\text{wherein: } \Phi = \frac{1}{e^{\frac{-t_d}{\tau}} + 1}$$

and wherein $x_i$ is the first position, $x_S$ is the intermediate position, $x_f$ is the second position, $t_d$ is the delay of half an oscillation period after the first time, and $\tau$ is a time constant of decay of oscillations of the moving part.

According to an embodiment of the present invention, the intermediate level and the second level of the electrical signal are determined from look-up tables based on the intermediate position and the new position respectively, wherein there is preferably a linear relationship between the levels of the electrical signal and the positions of the moving part.

According to an embodiment of the present invention, the intermediate electrical signal and the delay of half an oscillation period of the moving part are calculated using constant values relating to a time constant of decay of oscillation of the moving part and on an oscillating frequency of the moving part, the constant values being stored in a memory.

According to an embodiment of the present invention, the method further comprises determining, during a calibration phase, the constant values based on measurements of oscillations of the moving part in response to a change in the electrical signal, wherein the constant values are, for example, stored in a non-volatile memory which is accessible during control of the voice coil motor.

According to an embodiment of the present invention, the moving part comprises lens of a mobile lens unit.

According to another aspect of the present invention, there is provided control circuitry for controlling a moving part of a voice coil motor to move from a first position to a second position, wherein the position of the moving part is controlled by the level of an electrical signal applied to a coil of the voice coil motor, a first level of the electrical signal corresponding to the first position, and a second level of the electrical signal corresponding to the second position, the control circuitry comprising: a processor arranged to determine an intermediate level of the electrical signal between the first and second levels, the intermediate level calculated based on the second position, an oscillating frequency of the moving part and on a time constant of decay of the oscillations of the moving part, and being calculated to correspond to a level that causes a first overshoot of the moving part having a peak displacement corresponding to the new position; and driving circuitry coupled to the coil and arranged to apply the intermediate level to the coil at a first time and to apply the second level at a second time calculated to correspond to a delay of half an oscillation period of the moving part after the first time.

According to a further aspect of the present invention, there is provided an electronic device comprising a voice coil motor, a non-volatile memory arranged to store at least one parameter relating to a time constant of decay of oscillation of the moving part and on an oscillating frequency of the moving part, and the above control circuitry.

According to a further aspect of the present invention, there is provided an optical device comprising a mobile lens unit comprising a lens barrel and a voice coil motor, an image sensor, a memory, and the above control circuitry.

According to a further aspect of the present invention, there is provided a digital camera and/or a mobile telephone comprising the above optical device.

BRIEF DESCRIPTION OF THE FIGURES

The foregoing and other purposes, features, aspects and advantages of the invention will become apparent from the following detailed description of embodiments, given by way of illustration and not limitation with reference to the accompanying drawings, in which.

DETAILED DESCRIPTION

Figure 1:
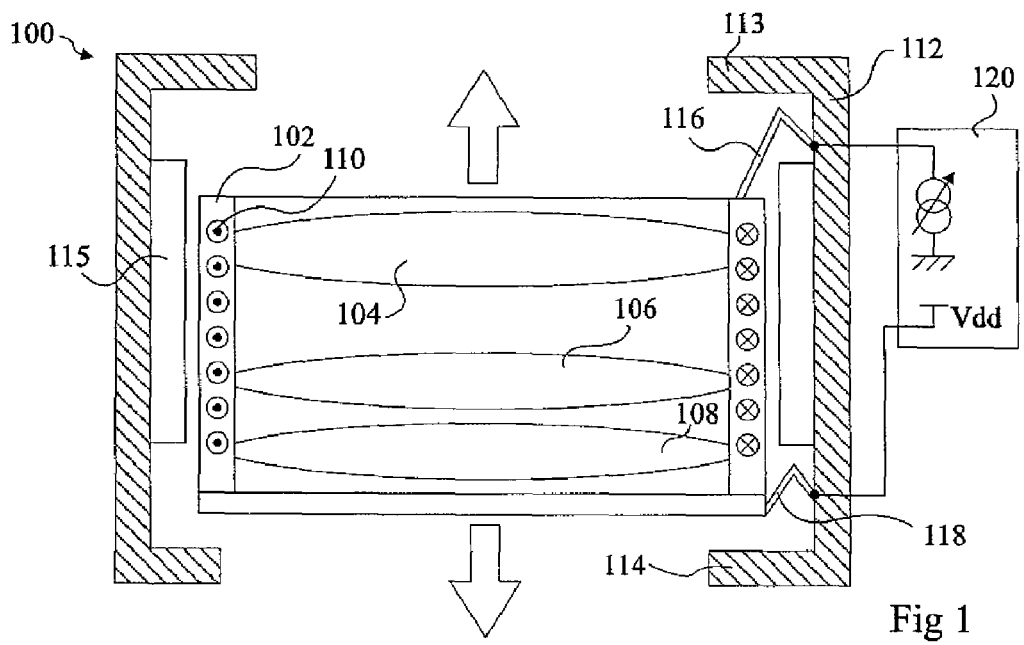
FIG. 1 (described above) illustrates a mobile lens unit.
Figure 2A:
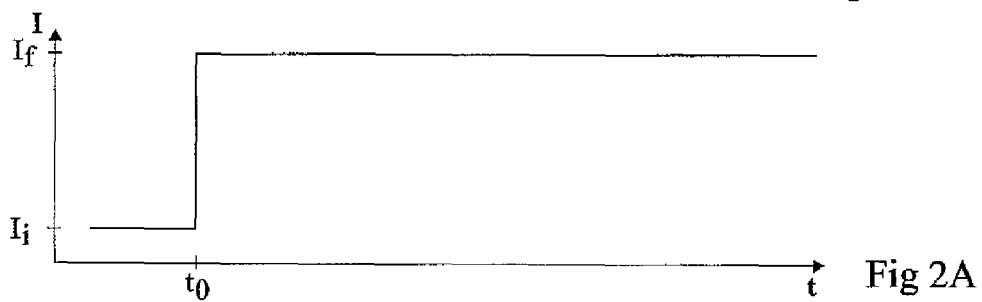
FIG. 2A (described above) is a graph illustrating a current change applied to the coil of FIG. 1.
Figure 2B:
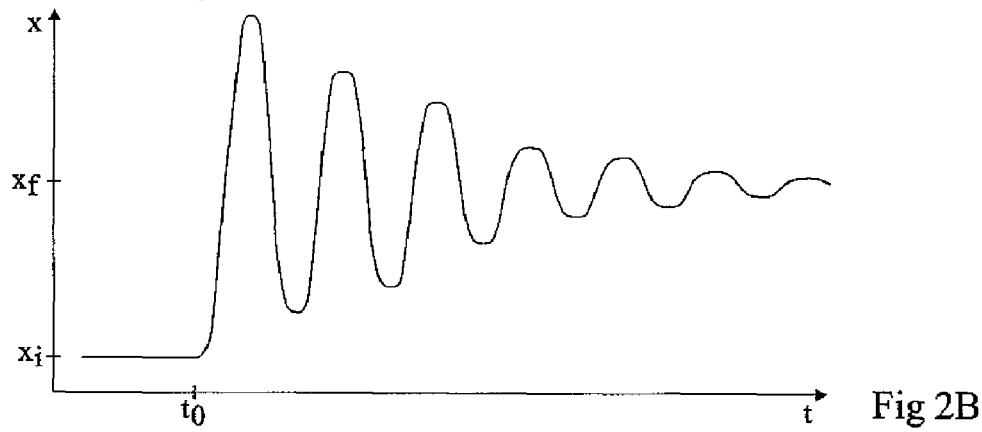
FIG. 2B (described above) is a graph illustrating displacement of the lens barrel of FIG. 1 in response to the current change of FIG. 2A.
Figure 3:
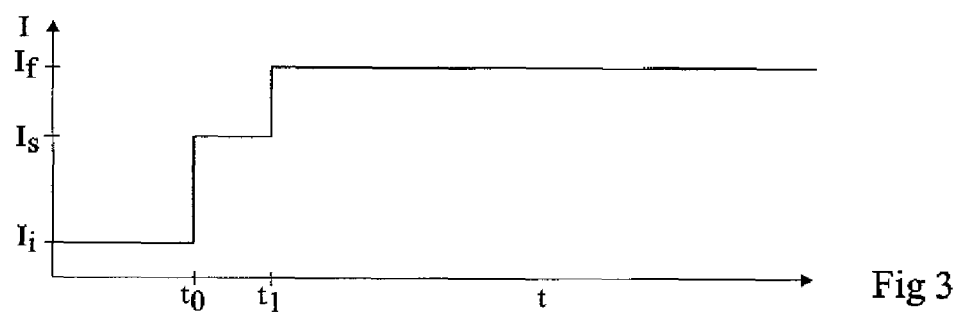
FIG. 3 is a graph illustrating current changes applied to the coil of FIG. 1 according to an embodiment of the present invention.

FIG. 3 is a graph illustrating current changes applied to the coil 110 of FIG. 1 in order to change the position of the lens barrel 102. In this example the current is to be increased from an initial value $I_i$ to a final value $I_f$, to move the lens barrel upwards, from a first position to a second position. As illustrated, the current is increased in two steps. At time $t_0$, the current is increased from the initial current $I_i$ to a step value $I_S$, which is between the initial current $I_i$ and the final current $I_f$. Then, at time $t_1$, the current is again increased to bring it to the final current $I_f$, which has a level corresponding to the current for maintaining the lens barrel at the second position.

In alternative embodiments in which the position of the lens barrel is to be lowered in the housing, the initial current $I_i$ is higher than the final current $I_f$. In this case, the current is decreased at time $t_0$ from $I_i$ to an intermediate value $I_S$ between $I_i$ and $I_f$, and then at time $t_1$ it is decreased to $I_f$.

The value $I_S$ and the time of $t_1$ at which the final current $I_f$ is applied are chosen to avoid oscillations of the lens barrel as will now be explained with reference to FIG. 4.

Figure 4:
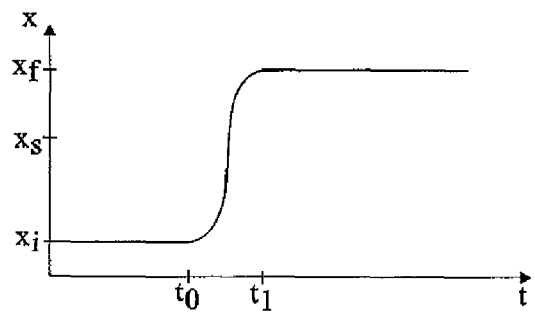
FIG. 4 is a graph illustrating displacement of the lens barrel of FIG. 1 in response to the current changes of FIG. 3.

FIG. 4 is a graph illustrating displacement x of the lens barrel 102 in response to the current changes of FIG. 3. As illustrated, the lens barrel 102 starts at a first position $x_i$. At time $t_0$, when current $I_S$ is applied, the position of the lens barrel changes rapidly, accelerating until it reaches its maximum velocity at position $x_S$, which is the position associated with current $I_S$, and then overshooting. As soon as the lens barrel passes $x_S$, it starts decelerates, until it reaches the peak of the first oscillation, when its speed falls to zero. Current $I_S$ is chosen such that this maximum displacement is the desired final position $x_f$ of the lens barrel. At this point, the final current $I_f$ is applied, at time $t_1$. This change to $I_f$ prevents the lens barrel accelerating back towards position $x_S$, and the final current $I_f$ maintains the lens barrel at the second position $x_f$, with little or no oscillation. Thus the lens barrel is moved very quickly from the initial position to the final position, with a very short settling time.

According to the above method, there are two parameters that are controlled to change the position of the lens barrel. Firstly, the value of the current $I_S$ applied at to is chosen such that the peak of the first oscillation caused by $I_S$ corresponds to the desired second position $x_f$ of the lens barrel. Secondly, the time $t_1$ that the final current $I_f$ is applied is chosen such that it corresponds to the peak displacement of the lens barrel, when it reaches position $x_f$. Time t1 is preferably determined using time to as the reference, and thus in the following the delay $t_d$ between $t_0$ and $t_1$, which is equal to $t_1-t_0$, will be referred to.

In order to calculate $I_S$ and $t_d$, the response of a mass spring system to a step-change in force applied to a mass can be used to model the displacement of the lens barrel in response to the electromagnetic force generated by a change in current. This gives a displacement x(t) of the type:

$$x(t) = x_{end} + (x_{ini} - x_{end}) \cdot e^{-\frac{t}{\tau}} \cdot \left( \cos(\omega \cdot t) + \frac{1}{\omega \cdot \tau} \cdot \sin(\omega \cdot t) \right) \quad (1)$$

where t is time, $x_{end}$ is the second position, $x_{ini}$ is the first position, $\tau$ is the time constant of decay of the oscillation of the mass, which results from friction in the system, and $\omega$ is the oscillating frequency of the system.

The first peak in the displacement when the speed falls to zero corresponds to a time after the change in force equal to half the time period of an oscillation, which is equal to $2\pi/\omega$. Thus $t_d = \pi/\omega$, which can be calculated by knowing the oscillating frequency, which is substantially constant for a given lens barrel.

The peak displacement is $x_{end} + (x_{end} - x_{ini}) \cdot e^{-t/\tau}$. If the above model is applied to the application of the intermediate current $I_S$ to the voice coil motor, the first position $x_{ini}$ corresponds to position $x_i$ of the lens barrel, the end position $x_{end}$ corresponds to the intermediate position $x_S$, and the peak displacement corresponds to the desired second position $x_f$ of the lens barrel. Thus the intermediate position $x_S$, adapted for a start position $x_i$ at $t_0$, and to incur a peak of $x_f$ at delay $t_d$ after $t_0$, can be expressed as follows:

$$x_s = \frac{x_f + e^{\frac{-t_d}{\tau}} \cdot x_i}{e^{\frac{-t_d}{\tau}} + 1} = \frac{x_f \cdot e^{\frac{t_d}{\tau}} + x_i}{e^{\frac{t_d}{\tau}} + 1} \quad (2)$$

This can we rewritten as:

$$x_s = (x_f - x_i)\Phi + x_i \quad (3)$$

wherein: $\Phi = \dfrac{1}{e^{\frac{-t_d}{\tau}} + 1}$ $x_S$ can be determined based on the first position $x_i$, final desired position $x_f$, and parameter $\Phi$, which is based on the time delay $t_d$ and the time constant of decay $\tau$. As shown in formula (3) above, when based on $\Phi$, the calculation becomes only a subtraction, multiplication and addition, which can be easily performed, for example by a low powered processor. Once $x_S$ has been calculated, the value of $I_S$ can be determined, for example using a lookup table or known relationship between the current in the coil and corresponding displacement of the lens barrel. The current/displacement relationship is for example linear, and of the form $x_i = aI_S + x_0$, where "a" is a proportionality factor and $x_0$ an offset.

Thus, to change the position of the lens barrel from an first position $x_i$ to a second desired position $x_f$, and knowing the time delay $t_d$ and the time constant of decay $\tau$ of the oscillation of the mobile lens unit, a current $I_S$ is first applied at time t0, calculated based on the associated position $x_S$ determined using formula (2) above, and then a time delay $t_d$ after $t_0$, at time $t_1$, the final current $I_f$ is applied, determined based on the second desired position $x_f$ of the lens barrel.

The values for the constants $t_d$ and $\tau$ can, for example, be stored in a non-volatile memory associated with the mobile lens unit. Assuming that manufacturing processes for producing the mobile lens units have a high level of precision, it may be sufficient to use the same constants for a series of mobile lens units. However, as manufacturing variations are possible, it is preferable that these constants are determined and stored during a calibration phase for a particular device. There are a number of ways they can be determined. One possible solution would be measuring the oscillations of a lens unit after applying a step change in the current, using a position sensor. Alternatively, the position of the lens barrel could be tracked by measuring the back EMF (electromotive force) voltage in the coil generated by the moving lens barrel.

In some embodiments, when the initial position of the lens barrel is in contact with one of the end stops provided by rims 113, 114 of FIG. 1, the algorithm is adapted to compensate for the current level that should be reached to separate the lens barrel from either of these end stops. For example, a certain minimum current $I_{min}$ should be applied to start linear movement of the lens barrel when the lens barrel is in contact with the rim 114 at the bottom of the lens housing. Likewise, the current should fall to $I_{max}$ before the lens barrel leaves the upper rim 113 of the lens housing. The values of $I_{min}$ and $I_{max}$ could be stored in memory, or alternatively, as these values can vary according to the orientation of the lens barrel due to gravity, they can be recalculated at regular intervals, using sensors to detect when the barrel is in contact with the rims. The currents $I_S$ and $I_f$ which are determined based on positions $x_S$ and $x_f$ respectively can thus be determined taking into account these offsets.

If the final position of the lens barrel $x_f$ is determined as being in contact with one of the end stops provided by rims 113, 114, an alternative algorithm to this described above could be applied to prevent impact between the lens barrel and one of the end stops. For example, the above method could be used to move the lens barrel to a position close to one of the end stops, allowing a small margin for any small oscillations, and then a final current corresponding to the position in contact with the end stop can be applied shortly afterwards.

Figure 5:
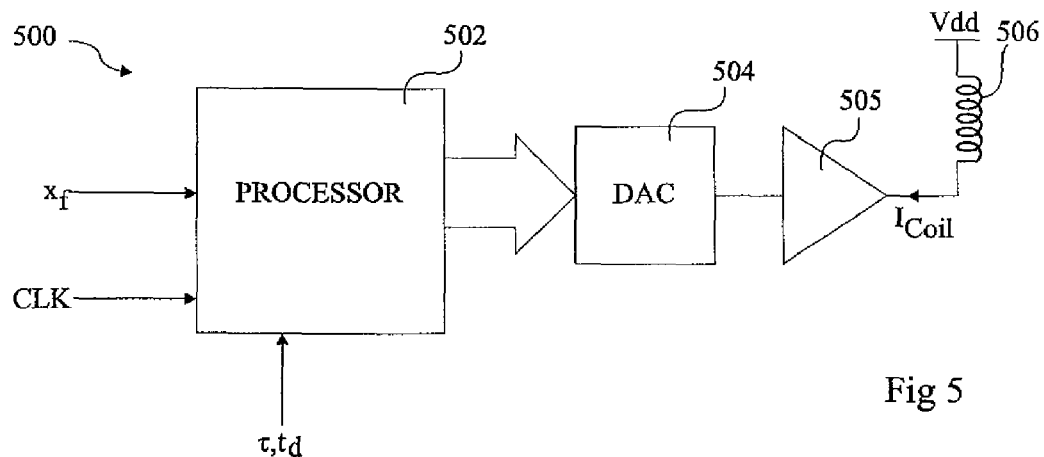
FIG. 5 illustrates circuitry for controlling position of a lens barrel according to an embodiment of the present invention.

FIG. 5 illustrates a lens barrel control circuit 500 arranged to perform the steps described above. Circuit 500 comprises a processor 502, which receives a signal $x_f$ indicating a final displacement of the lens which is required, a clock signal CLK, for timing the changes in current, and an input for receiving reference values $\tau$ and $t_d$. The first position $x_i$, of the lens barrel is, for example, known from the initial current $I_i$ presently applied to the coil, or from a second position $x_f$ of a previous lens movement.

The processor 502 generates an output signal in digital form which is provided to a digital to analog converter (DAC) 504. The output of the DAC is provided to an amplifier 505, which drives a coil 506 of a voice coil motor. Coil 506 is for example the coil 110 of FIG. 1, connected to amplifier 505 via the springs 116, 118.

Figure 6:
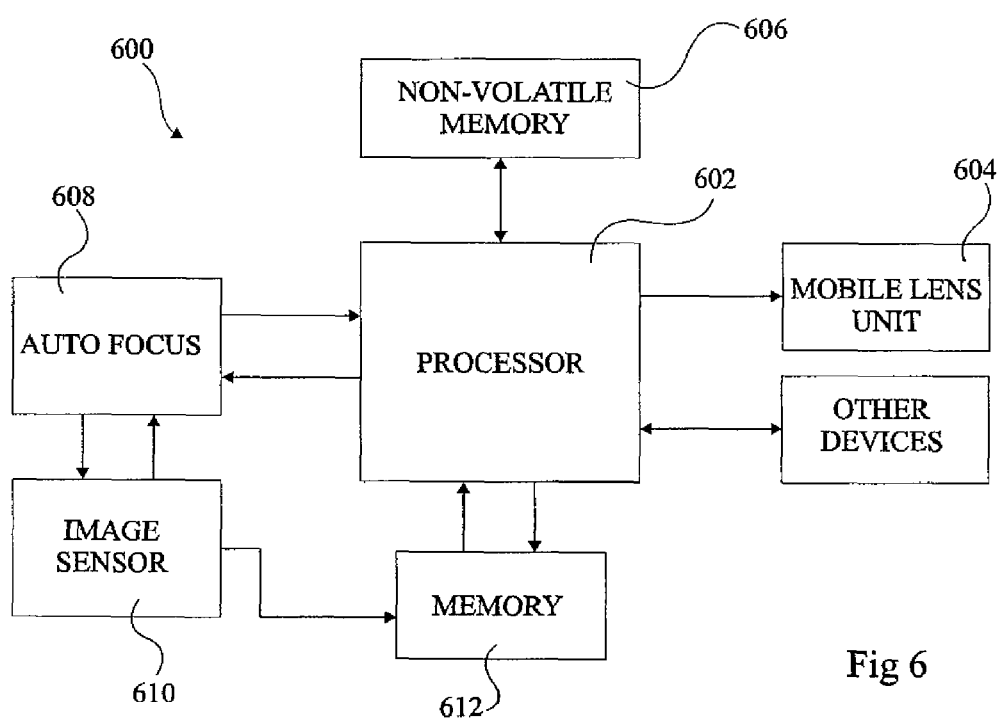
FIG. 6 illustrates an optical device according to an embodiment of the present invention.

FIG. 6 illustrates a device 600 comprising a processor 602, connected to a mobile lens unit 604, which is for example the mobile lens unit 100 of FIG. 1. Mobile lens unit 604 also comprises a digital to analog converter and an amplifier for driving the coil of the lens barrel. In this embodiment, processor 602 comprises processing means for generating the current control signals for driving the lens barrel. Processor 602 is connected to a non-volatile memory 606 which stores the constants $t_d$ and $\tau$ relating to the lens barrel. Processor 602 is also connected to an autofocus block 608, which is arranged to determine focusing of the lens, for example using a focusing sensor, or determined based on images from an image sensor. The autofocus block 608 is coupled to the image sensor 610, which is in turn coupled to a further memory 612, which stores images captured by the image sensor 610.

In operation, the autofocus block 608 determines what displacement of the lens barrel is needed to focus images formed on the image sensor 610, for example based on an algorithm. The autofocus block 608 communicates this, for example in the form of a final position $x_f$, to the processor, which determines the current steps to be applied to the lens unit 604 and controls the lens unit 604 accordingly.

Device 600 is for example a digital camera, mobile telephone, PDA (Personal Digital Assistant), PC with webcam, or alternative image capturing device.

Various alterations, modifications and improvements will readily occur to those skilled in the art.

While the embodiments described above relate to a current controlled voice coil motor, in alternative embodiments voltage could equally be used to control VCM, in which case the driver 505 of FIG. 5 generates a voltage signal which is applied to the coil. In such embodiments the voltage could be adjusted to compensate for temperature variations in the coil.

While embodiments of the present invention have been described in relation to a mobile lens unit, it would be apparent to those skilled in the art that this invention could be applied to other applications of a VCM motor in which low settling times are desirable, such as lens positioning devices in optical storage drives or mechanical translation stages.

It would be apparent to those skilled in the art that depending on the accuracy of the constants $t_d$ and $\tau$, the lens barrel may still oscillate to some extent, while to a much lesser extent than in prior known methods of VCM control. However, as explained in the background section, a minimum amplitude of oscillation is acceptable in many applications, and in particular, in the case of a lens system, oscillations having an amplitude less than the depth of focus do not affect the focusing of the image on the image sensor. The depth of focus is for example in the region of 5 μm for relatively small lens barrels, and thus oscillations having amplitude of up to 5 μm may be allowable in such systems. Thus oscillations of the moving part of a voice coil motor are preferably lower than such a minimum amplitude level in the embodiments described herein.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of controlling a moving part of a voice coil motor to move from a first position to a second position, wherein the position of the moving part is controlled by the level of an electrical signal applied to a coil of the voice coil motor, a first level of said electrical signal corresponding to said first position, and a second level of said electrical signal corresponding to said second position, the method comprising:

at a first time, changing the electrical signal from said first level to an intermediate level, said intermediate level being chosen such that a peak overshoot of the moving part corresponds to said second position; and at a second time calculated to correspond to a delay of half an oscillation period of said moving part after said first time, changing the electrical signal to said second level.

2. The method of claim 1, wherein said electrical signal is a current signal, and said first level, second level and intermediate level are current levels.

3. The method of claim 1, wherein said intermediate electrical signal is calculated based on an electrical signal corresponding to an intermediate position of said moving part, according to the following formula:

$$x_s = (x_f - x_i)\Phi + x_i$$

$$\text{wherein: } \Phi = \frac{1}{e^{\frac{-t_d}{\tau}} + 1}$$

and wherein $x_i$ is said first position, $x_S$ is said intermediate position, $x_f$ is said second position, $t_d$ is said delay of half an oscillation period after said first time, and $\tau$ is a time constant of decay of oscillations of said moving part.

4. The method of claim 3, wherein said intermediate level and said second level of said electrical signal are determined from look-up tables based on said intermediate position and said second position respectively, wherein there is preferably a linear relationship between said levels of said electrical signal and said positions of said moving part.

5. The method of claim 1, wherein said intermediate electrical signal and said delay of half an oscillation period of said moving part are calculated using constant values relating to a time constant of decay of oscillation of said moving part and an oscillating frequency of said moving part, said constant values being stored in a memory.

6. The method of claim 5, further comprising determining, during a calibration phase, said constant values based on measurements of oscillations of said moving part in response to a change in said electrical signal, said constant values preferably being stored in a non-volatile memory which is accessible during control of said voice coil motor.

7. The method of claim 1, wherein said moving part comprises at least one lens of a mobile lens unit.

8. The method of claim 1, wherein said moving part is stationary with respect to the rest of the voice coil motor at said first time.

9. Control circuitry for controlling a moving part of a voice coil motor to move from a first position to a second position, wherein the position of the moving part is controlled by the level of an electrical signal applied to a coil of the voice coil motor, a first level of said electrical signal corresponding to said first position, and a second level of said electrical signal corresponding to said second position, the control circuitry comprising:

a processor arranged to determine a intermediate level of said electrical signal between said first and second levels, said intermediate level calculated based on at least said second position, an oscillating frequency of said moving part and on a time constant of decay of the oscillations of said moving part, and being calculated to correspond to a level that causes a first overshoot of the moving part having a peak displacement corresponding to said second position; and driving circuitry coupled to said coil and arranged to apply said intermediate level to said coil at a first time and to apply said second level at a second time calculated to correspond to a delay of half an oscillation period of said moving part after said first time.

10. An electronic device comprising the control circuitry of claim 9, a voice coil motor, and a non-volatile memory arranged to store at least one parameter relating to the time constant of decay of oscillation of said moving part and the oscillating frequency of said moving part.

11. An optical device comprising a mobile lens unit comprising a lens barrel and a voice coil motor, an image sensor, a memory, and the control circuitry of claim 9.

12. A digital camera comprising the optical device of claim 11.

13. A mobile telephone comprising the optical device of claim 11.

14. An apparatus comprising:
  circuitry configured to provide a control signal to a voice coil motor for moving a moving part of the voice coil motor from a first position to a second position; and
  a processor configured to determine an intermediate control signal level for moving the moving part to an intermediate position between the first position and the second position,
  wherein the circuitry is further configured to apply the intermediate control signal level at a first time and to apply a final signal level at a second time, and wherein an overshoot associated with the intermediate position has a maximum value that is approximately equal to the second position.

15. The apparatus of claim 14, wherein the processor is further configured to determine the intermediate position based upon the first position and the second position.

16. The apparatus of claim 15, wherein the processor is further configured to determine the intermediate position based upon a time constant corresponding to a decay of oscillations of the moving part and upon an oscillation frequency of the moving part or a time delay corresponding to the delay in time between the application of the intermediate control signal level and the application of the final signal level.

17. The apparatus of claim 16, wherein the time constant and the oscillation frequency or the time delay are stored in a memory of the apparatus.

18. The apparatus of claim 14, wherein the circuitry is configured to apply the final signal level at a time delay after the intermediate signal level that approximately corresponds to one-half a natural oscillation period of the moving part.

19. The apparatus of claim 14, wherein the processor is configured to calculate the intermediate position according to the equation for which $$x_s = (x_f - x_i)\Phi + x_i$$

for which $$\Phi = \frac{1}{e^{\frac{-t_d}{\tau}} + 1}$$

wherein $x_s$ is the intermediate position, $X_f$ is the second position, $x_1$ is the first position, $t_d$ is a time delay corresponding to the delay in time between the application of the intermediate control signal level and the application of the final signal level, and $\tau$ is a time constant corresponding to a decay of oscillations of the moving part.

20. The apparatus of claim 14, wherein the processor is configured to determine the intermediate control signal level and the final signal level from a look-up table or a known relationship between control signal levels and positions of the moving part.

21. The apparatus of claim 14, configured in a camera or a mobile telephone wherein the moving part comprises a lens.

22. An apparatus comprising:
  circuitry configured to provide a control signal to a voice coil motor for moving a moving part of the voice coil motor from a first position to a second position; and
  means for applying an intermediate control signal level for moving the moving part to an intermediate position at a first time and for applying a final signal level at a second time, wherein an overshoot associated with the intermediate position has a maximum value that is approximately equal to the second position.

23. The apparatus of claim 22, wherein the second time is delayed in time from the first time by an amount approximately equal to one-half a natural oscillation period of the moving part.

24. The apparatus of claim 22 configured in a camera or a mobile telephone wherein the moving part comprises a lens.

25. A method of operating a voice coil motor comprising:
  determining, by a processor, one intermediate position between a first position of a moving part that is controlled by the voice coil motor and a second position;
  applying an intermediate control signal level to the voice coil motor at a first time, the intermediate control signal level corresponding to the intermediate position; and
  applying a second control signal level to the voice coil motor at a second time, the second control signal level corresponding to the second position,
  wherein an overshoot associated with the intermediate position has a maximum value that is approx imately equal to the second position.

26. The method of claim 25, wherein the second control signal level is applied at a time delay after the application of the intermediate control signal that is approximately equal to one-half a natural oscillation period of the moving part.

27. The method of claim 25, wherein the determining comprises calculating the intermediate position according to the equation for which $$x_s = (x_f - x_i)\Phi + x_i$$

for which $$\Phi = \frac{1}{e^{\frac{-t_d}{\tau}} + 1}$$

wherein $x_s$ is the intermediate position, $x_f$ is the second position, $x_i$ is the first position, $t_d$ is a time delay corresponding to the delay in time between the application of the intermediate control signal level and the application of the final signal level, and $\tau$ is a time constant corresponding to a decay of oscillations of the moving part.

28. The method of claim 25, further comprising determining the intermediate control signal from a look-up table or a known relationship between control signal levels and positions of the moving part.

* * * * *